US012706328B2

(12) United States Patent
Seong et al.

(10) Patent No.: US 12,706,328 B2
(45) Date of Patent: Aug. 11, 2026

(54) METHOD OF SCREENING SOLID ELECTROLYTE HAVING EXCELLENT LITHIUM ION CONDUCTIVITY AND STABILITY

(71) Applicants: HYUNDAI MOTOR COMPANY, Seoul (KR); KIA CORPORATION, Seoul (KR); Industry-University Cooperation Foundation Hanyang University ERICA Campus, Ansan-si (KR)

(72) Inventors: Ju Yeong Seong, Seongnam-si (KR); In Woo Song, Gwacheon-si (KR); Sang Heon Lee, Yongin-si (KR); Sung Woo Noh, Seoul (KR); Je Sik Park, Seoul (KR); Jeong Hyun Seo, Daejeon (KR); Yong Jun Jang, Seongnam-si (KR); A Reum Ha, Ulsan (KR); Sang Uck Lee, Bucheon-si (KR); Byeong Sun Jun, Suwon-si (KR)

(73) Assignees: Hyundai Motor Company, Seoul (KR); Kia Corporation, Seoul (KR); Industry-University Cooperation Foundation Hanyang University Erica Campus, Ansan-si (KR)

( * ) Notice: Subject to any disclaimer, the term of this patent is extended or adjusted under 35 U.S.C. 154(b) by 865 days.

(21) Appl. No.: 18/070,969

(22) Filed: Nov. 29, 2022

(65) Prior Publication Data

US 2023/0187708 A1 Jun. 15, 2023

(30) Foreign Application Priority Data

Dec. 14, 2021 (KR) ........................ 10-2021-0178727

(51) Int. Cl.
*H01M 10/42* (2006.01)
*H01M 50/451* (2021.01)

(52) U.S. Cl.
CPC ..... *H01M 10/4235* (2013.01); *H01M 50/451* (2021.01)

(58) Field of Classification Search
CPC ........................ H01M 10/4235; H01M 50/451
See application file for complete search history.

(56) References Cited

PUBLICATIONS

Hautier et al., "Data-Mined Ionic Substitutions for the Discovery of New Compounds . . . " (Year: 2011).*

Kahle et al., "High-throughput screening of ICSD & COD for Li-ion . . . " (Year: 2019).*

He et al., "Unsupervised discovery of solid-state lithium ion conductors . . . " (Year: 2018).*

X. He, et al., "Statistical variances of diffusional properties from ab initio molecular dynamics simulations," Computational Materials, Apr. 3, 2018.

* cited by examiner

*Primary Examiner* — Jimmy Vo

(74) *Attorney, Agent, or Firm* — Morgan Lewis & Bockius LLP

(57) ABSTRACT

Disclosed is a method of screening a solid electrolyte having excellent lithium ion conductivity and stability.

5 Claims, 3 Drawing Sheets

METHOD OF SCREENING SOLID ELECTROLYTE HAVING EXCELLENT LITHIUM ION CONDUCTIVITY AND STABILITY

CROSS-REFERENCE TO RELATED APPLICATION

The present application claims priority to Korean Patent Application No. 10-2021-0178727, filed on Dec. 14, 2021, the entire contents of which is incorporated herein for all purposes by this reference.

BACKGROUND OF THE INVENTION

Field of the Invention

The present disclosure relates to a method of screening a solid electrolyte having excellent lithium ion conductivity and stability.

Description of Related Art

Rechargeable secondary batteries are used not only in small electronic devices such as mobile phones, laptops, and the like, but also in large devices such as vehicles including hybrid vehicles, electric vehicles, and the like. Accordingly, there is a need to develop a secondary battery having higher stability and energy density.

Conventional secondary batteries mostly constitute cells based on organic solvents (organic liquid electrolytes), so they are limited with regard to the extent to which stability and energy density can be increased.

Meanwhile, all-solid-state batteries using solid electrolytes have recently been in the spotlight because they are based on technology that obviates the use of organic solvents, and thus cells may be manufactured in a safer and simpler form.

The solid electrolyte conducts lithium ions in the electrode layer and/or the solid electrolyte layer. Therefore, it is essential to develop a solid electrolyte having excellent lithium ion conductivity and stability in order to increase battery capacity and efficiency.

$Li_6PS_5X$ (in which X is a halogen element), which is a representative sulfide-based solid electrolyte, was synthesized through substitution from the mineral argyrodite, $Ag_8GeS_6$, which is an Ag-ion super ionic conductor.

Specifically, $Cu_7PSe_6$ having conductivity to copper ions (I) ($Cu^+$) instead of silver ions ($Ag^+$) was initially synthesized, and compounds having various compositions such as $Cu_6PS_5X$ (in which X is a halogen element) and the like were then synthesized. Thereafter, $Li_6PS_5X$ (in which X is a halogen element), which is currently being actively studied, was synthesized by taking advantage of the fact that the ionic radius of lithium ions ($Li^+$) is similar to that of copper ions (I) ($Cu^+$).

The information disclosed in this Background of the Invention section is only for enhancement of understanding of the general background of the invention and may not be taken as an acknowledgement or any form of suggestion that this information forms the prior art already known to a person skilled in the art.

SUMMARY OF THE DISCLOSURE

Various aspects of the present disclosure are directed to providing a method of screening a solid electrolyte having a novel composition that has not yet been studied.

The objects of the present invention are not limited to the foregoing. The objects of the present invention will be able to be clearly understood through the following description and to be realized by the means described in the claims and combinations thereof.

An embodiment of the present invention provides a method of screening a solid electrolyte including preparing a population by extracting a crystallographic information framework (CIF) of a compound containing a specific element from a crystallography open database (COD) or an inorganic crystal structure database (ICSD), screening a first group comprising compounds for which the site occupancy of the specific element in a unit cell is not 1 among the population, screening a second group comprising compounds satisfying Condition 1 below among the first group, preparing a third group by substituting each element of the compounds included in the second group with another element belonging to the same group of the periodic table, wherein the specific element is substituted with a lithium (Li) element, and screening compounds satisfying Condition 2 below among the third group.

[Condition 1]

Compound in which a mean square displacement of a specific element is 30 $Å^2$ or greater

[Condition 2]

Compound in which a maximum framework displacement of an element in a unit cell is less than 50 Å

The specific element may include silver (Ag) or copper (Cu).

The mean square displacement of the specific element in Condition 1 may be determined using Equation 1 below:

Mean square displacement of specific element = [Equation 1]

$$<[r(t)]^2> = \frac{1}{N}\sum_i <[r_i(t+t_0)]^2 - [r_i(t_0)]^2>$$

wherein N is the number of the specific element (i) in a unit cell, t is the unit time, $r_i(t+t_0)$ is the displacement of the specific element (i) after a unit time has elapsed, and $r_i(t_0)$ is the initial position of the specific element (i).

The maximum framework displacement of the element in the unit cell in Condition 2 may be determined using Equation 2 below:

Maximum framework displacement of element in unit cell = $\max[D_i]$ [Equation 2]

$$D_i = d_i(\Delta t) - \sum_{i=0}^{n} \frac{d_i(\Delta t)}{n}$$

wherein $d_i(\Delta t)$ is the displacement of an element (i) in a unit cell at a given time (dt), and n is the total number of elements in the unit cell.

The method may further include screening a compound satisfying Condition 3 below among the compounds satisfying Condition 2:

[Condition 3]

Compound having a relative displacement of less than 1 in which the relative displacement is determined using an equation $$\text{Relative displacement} = \max\left(\frac{MSD_{fi}}{MSD_{mi}}\right),$$

$MSD_{mi}$ being the mean square displacement of a lithium (Li) element and $MSD_{fi}$ being the mean square displacement of an element in a unit cell.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
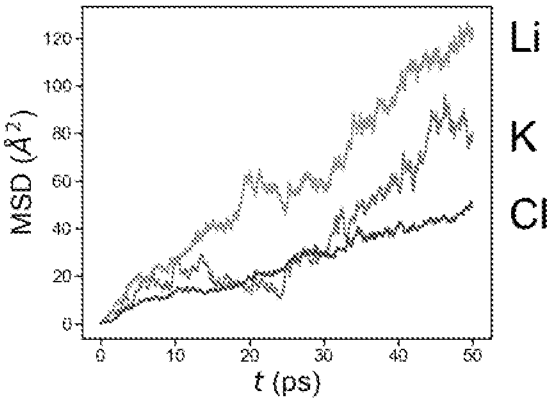
FIG. 1A shows the results of measurement of the mean square displacement of each element in a compound represented by $KLi_4Cl_5$.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The above and other objects, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the disclosure and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

According to the present invention, a method of screening a solid electrolyte may include preparing a population by extracting a crystallographic information framework (CIF) of a compound containing a specific element from a crystallography open database (COD) or an inorganic crystal structure database (ICSD), screening a first group comprising compounds for which the site occupancy of the specific element in a unit cell is not 1 among the population, screening a second group comprising compounds satisfying Condition 1 below among the first group, preparing a third group by substituting each element of the compounds included in the second group with another element belonging to the same group of the periodic table, wherein the specific element is substituted with a lithium (Li) element, and screening compounds satisfying Condition 2 below among the third group.

[Condition 1]

Compound in which a mean square displacement of a specific element is 30 Å$^2$ or greater.

[Condition 2]

Compound in which a framework displacement of an element in a unit cell is less than 50 Å

The specific element may be a silver (Ag) element or a copper (Cu) element. Therefore, the population may be all compounds for which the crystallographic information framework (CIF) is obtained from the crystallography open database (COD) or an inorganic crystal structure database (ICSD) and which include silver (Ag) or copper (Cu).

In the crystallographic information framework (CIF), location information of each element of the compounds and the site occupancy thereof in the unit cell are recorded together. The first group may be formed by screening compounds for which the site occupancy of the specific element in the unit cell is not 1, among the compounds in the population.

When the site occupancy of the specific element is 1, it means that the site where the specific element is located is 100% filled with the specific element. In the present disclosure, compounds for which the site occupancy of the specific element is not 1 are screened, because ion conductivity is good in the presence of a vacancy through which ions are able to move.

Thereafter, the second group may be formed by screening compounds having lithium ion conductivity, among the compounds included in the first group. Specifically, when a compound included in the first group satisfies Condition 1 below, it can be said to have lithium ion conductivity.

[Condition 1]

Compound in which a mean square displacement of a specific element is 30 Å$^2$ or greater.

The mean square displacement of the specific element may be determined using Equation 1 below.

Mean square displacement of specific element = [Equation 1]

$$<[r(t)]^2> = \frac{1}{N}\sum_i <[r_i(t+t_0)]^2 - [r_i(t_0)]^2>$$

In Equation 1, N is the number of the specific element (i) in the unit cell, t is the unit time, $r_i(t+t_0)$ is the displacement of the specific element (i) after the unit time has elapsed, and $r_i(t_0)$ is the initial position of the specific element (i).

The mean square displacement of the specific element indicates the distance that the specific element moves in a unit time. The unit time may be about 30 ps.

The $r_i(t_0)$ may be obtained from the crystallographic information framework (CIF) described above.

The $r_i(t+t_0)$ may be obtained through simulation using molecular dynamics, particularly Ab initio molecular dynamics (AIMD).

Table 1 below shows the second group, obtained by screening compounds containing silver (Ag), as described above.

TABLE 1

| No. | COD ID | Chemical Formula | Mean square displacement of Ag [Å$^2$] |
|---|---|---|---|
| 1 | 1011337 | $Ag_3S_2$ | 63.59 |
| 2 | 1509002 | $AgCuBi_{12}S_{18}$ | 41.59 |
| 3 | 1509052 | $Ag_4CuBi_{13}Pb_4S_{26}$ | 379.82 |
| 4 | 1509497 | $Ag_8V_8O_{24}$ | 757.45 |
| 5 | 1509501 | $Ag_7Si_8Sb_8O_{40}$ | 31.41 |
| 6 | 1509584 | $Ag_2V_6O_{16}$ | 169.78 |
| 7 | 1509595 | $Ag_3Bi_5S_6Br_6$ | 298.68 |
| 8 | 1509641 | $Ag_{19}Tl_6Se_{13}$ | 34.36 |
| 9 | 1509696 | $Ag_8Sn_4O_{12}$ | 36.06 |
| 10 | 1509751 | $Ag_{17}As_6S_{18}$ | 35.64 |
| 11 | 1509754 | $Ag_6V_8O_{24}$ | 73.33 |
| 12 | 1509872 | $Ag_8Hg_4Ge_2Se_{12}$ | 36.98 |
| 13 | 1509878 | $Ag_{16}Rb_4I_{20}$ | 90.85 |
| 14 | 1509902 | $Ag_{10}Hg_3Ge_2Se_{12}$ | 32.89 |
| 15 | 1509904 | $Ag_{10}Si_2Hg_3Se_{12}$ | 33.41 |
| 16 | 1509934 | $Ag_{12}Hg_2Ge_2Se_{12}$ | 64.59 |
| 17 | 1509979 | $Ag_9Y_3Cl_{18}$ | 54.75 |
| 18 | 1509980 | $Ag_{16}Ba_4S_{14}$ | 39.13 |
| 19 | 1530489 | $Ag_6P_2O_8$ | 37.52 |
| 20 | 2100444 | $Ag_{13}Cu_3SbAsS_{11}$ | 36.38 |
| 21 | 4002912 | $Ag_5CdSb_{13}Se_{24}$ | 339.10 |
| 22 | 4330454 | $Ag_3Sr_4Mn_2Se_4O_4$ | 253.01 |
| 23 | 4339694 | $Ag_8Ba_4Se_{10}$ | 35.01 |
| 24 | 4344997 | $Ag_{28}Sn_4P_{12}S_{48}$ | 38.05 |
| 25 | 7100874 | $Ag_3Rb_4Bi_{15}Se_{26}$ | 182.44 |
| 26 | 7205024 | $Ag_{20}Sb_4S_{12}I_8$ | 72.69 |
| 27 | 8103414 | $Ag_{25}V_6I_{12}O_{21}$ | 48.86 |
| 28 | 9011524 | $Ag_2SbAs_{18}Pb_{11}S_{40}$ | 41.83 |
| 29 | 9015565 | $Ag_4Bi_8Pb_2Se_{16}$ | 63.59 |

The third group may be formed by substituting each element of the compounds included in the second group, screened as described above, with another element belonging to the same group of the periodic table as the element. Here, the specific element of the compound, namely a silver (Ag) element or a copper (Cu) element, may be substituted with a lithium (Li) element.

A solid electrolyte having excellent lithium ion conductivity and stability may be selected by screening compounds satisfying Condition 2 below, among the compounds included in the third group.

[Condition 2]

Compound in which a maximum framework displacement of an element in a unit cell is less than 50 Å.

The maximum framework displacement of the element in the unit cell may be determined using Equation 2 below.

Maximum framework displacement of element in unit cell = $\max[D_i]$ [Equation 2]

$$D_i = d_i(\Delta t) - \sum_{i=0}^{n}\frac{d_i(\Delta t)}{n}$$

In Equation 2, $d_i(\Delta t)$ is the displacement of the element (i) in the unit cell at a given time (dt), and n is the total number of elements in the unit cell.

The elements in the unit cell may include lithium (Li), silver (Ag), copper (Cu), etc.

The maximum framework displacement of the elements in the unit cell indicates a maximum distance among distances moved by the elements. If the value of the maximum framework displacement is large, the crystal structure of the compound is not maintained, which means that the stability of the compound is deteriorated.

The maximum framework displacement may be the maximum distance among distances moved by elements in a unit time under the temperature condition of about 600 K. The unit time may be about 50 ps.

The maximum framework displacement may be determined through simulation using molecular dynamics, particularly Ab initio molecular dynamics (AIMD).

Exemplarily, the third group was derived from $Ag_{16}Rb_4I_{20}$ ($RbAg_4I_5$), corresponding to No. 13 in Table 1, and the results of calculation of the maximum framework displacement thereof are shown in Table 2 below.

TABLE 2

| Temperature | | K | | Rb | | Cs | |
|---|---|---|---|---|---|---|---|
| [K] | X | Ag | Li | Ag | Li | Ag | Li |
| 600 | Cl | 12.00 | 14.62 | 16.71 | 10.74 | 15.56 | 17.49 |
| | Br | 18.13 | 11.50 | 15.75 | 11.00 | 10.73 | 15.74 |
| | I | 5.29 | 7.03 | 7.56 | 8.35 | 4.38 | 16.65 |

Specifically, in $Ag_{16}Rb_4I_{20}$ ($RbAg_4I_5$), the maximum framework displacement was calculated for substitution of rubidium (Rb) with potassium (K) and cesium (Cs) belonging to the same group of the periodic table, substitution of silver (Ag) with lithium (Li), and substitution of iodine (I) with chlorine (Cl) and bromine (Br).

With reference thereto, it can be found that $KLi_4I_5$ (7.03 Å), $RbLi_4I_5$ (8.35 Å), and $CsLi_4Br_5$ (15.74 Å) are solid electrolytes having low atomic movement and thus excellent stability.

Also, the method of the present invention may further include screening a compound satisfying Condition 3 below, among the solid electrolytes screened as described above.

[Condition 3]

Compound having a relative displacement of less than 1

Here, the relative displacement is determined using the equation $$\text{Relative displacement} = \max\left(\frac{MSD_{fi}}{MSD_{mi}}\right),$$

in which $MSD_{mi}$ is the mean square displacement of lithium (Li) and $MSD_{fi}$ is the mean square displacement of the element in the unit cell.

Relative displacement means how much the element in the unit cell moves relative to the lithium element. When the movement of the element in the unit cell is greater than that of the lithium element, it can be said that neither lithium ion conductivity nor stability is satisfied.

Figure 1B:
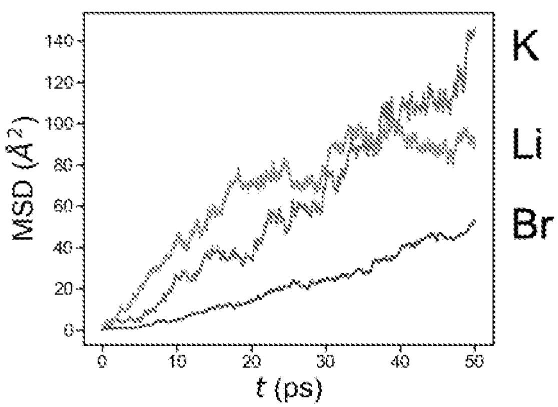
FIG. 1B shows the results of measurement of the mean square displacement of each element in the compound represented by $KLi_4Br_5$.
Figure 1C:
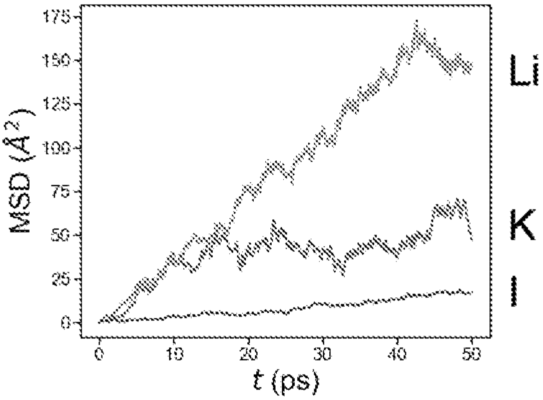
FIG. 1C shows the results of measurement of the mean square displacement of each element in the compound represented by $KLi_4I_5$.

FIG. 1A shows the results of measurement of the mean square displacement of each element in the compound represented by $KLi_4Cl_5$ in Table 2. FIG. 1B shows the results of measurement of the mean square displacement of each element in the compound represented by $KLi_4Br_5$ in Table 2. FIG. 1C shows the results of measurement of the mean square displacement of each element in the compound represented by $KLi_4I_5$ in Table 2. With reference thereto, it can be found that $KLi_4I_5$ of FIG. 1C has high lithium ion conductivity and also excellent stability due to the persistence of the crystal structure, because there is almost no movement of elements other than the lithium element.

Figure 2A:
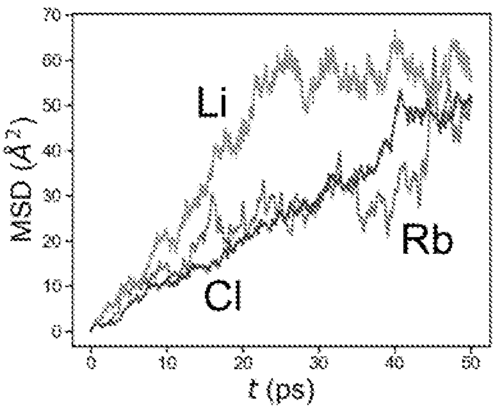
FIG. 2A shows the results of measurement of the mean square displacement of each element in the compound represented by $RbLi_4Cl_5$.
Figure 2B:
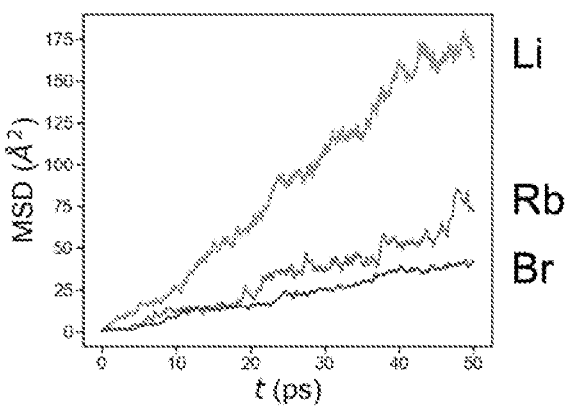
FIG. 2B shows the results of measurement of the mean square displacement of each element in the compound represented by $RbLi_4Br_5$.
Figure 2C:
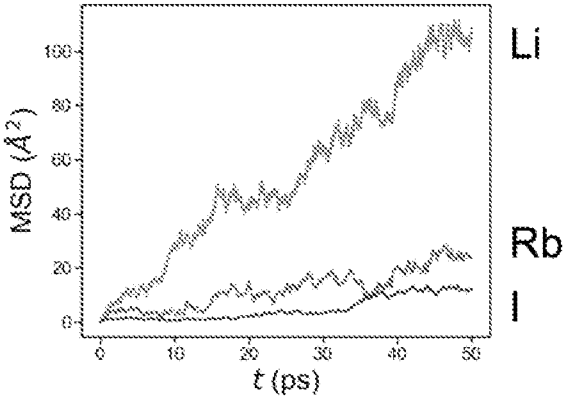
FIG. 2C shows the results of measurement of the mean square displacement of each element in the compound represented by $RbLi_4I_5$.

FIG. 2A shows the results of measurement of the mean square displacement of each element in the compound represented by $RbLi_4Cl_5$ in Table 2. FIG. 2B shows the results of measurement of the mean square displacement of each element in the compound represented by $RbLi_4Br_5$ in Table 2. FIG. 2C shows the results of measurement of the mean square displacement of each element in the compound represented by $RbLi_4I_5$ in Table 2. With reference thereto, it can be found that $RbLi_4I_5$ of FIG. 2C has high lithium ion conductivity and also excellent stability due to the persistence of the crystal structure, because there is almost no movement of elements other than the lithium element.

Figure 3A:
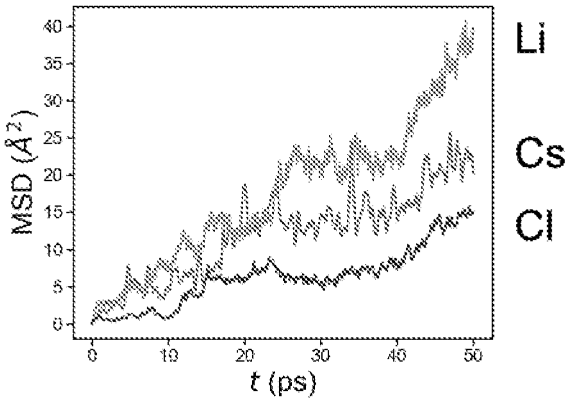
FIG. 3A shows the results of measurement of the mean square displacement of each element in the compound represented by $CsLi_4Cl_5$.
Figure 3B:
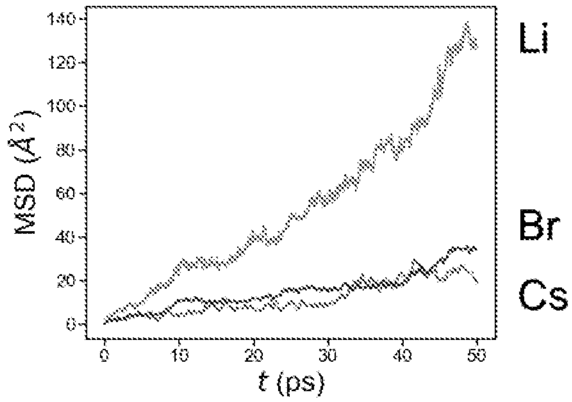
FIG. 3B shows the results of measurement of the mean square displacement of each element in the compound represented by $CsLi_4Br_5$.
Figure 3C:
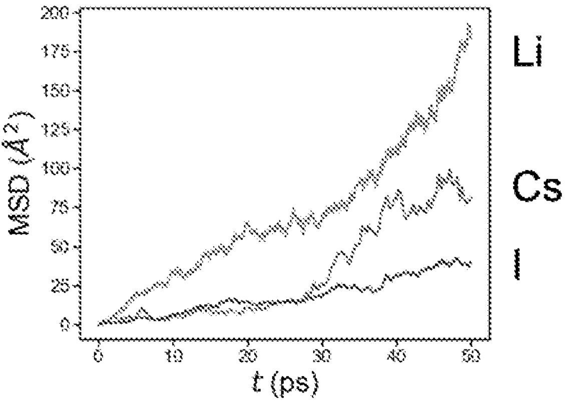
FIG. 3C shows the results of measurement of the mean square displacement of each element in the compound represented by $CsLi_4I_5$.

FIG. 3A shows the results of measurement of the mean square displacement of each element in the compound represented by $CsLi_4Cl_5$ in Table 2. FIG. 3B shows the results of measurement of the mean square displacement of each element in the compound represented by $CsLi_4Br_5$ in Table 2. FIG. 3C shows the results of measurement of the mean square displacement of each element in the compound represented by $CsLi_4I_5$ in Table 2. With reference thereto, it can be found that $CsLi_4Br_5$ of FIG. 3B has high lithium ion conductivity and also excellent stability due to the persistence of the crystal structure, because there is almost no movement of elements other than the lithium element.

As is apparent from the above description, according to the present invention, a solid electrolyte having excellent lithium ion conductivity and stability and having a new composition can be obtained.

The effects of the present invention are not limited to the above-mentioned effects. It should be understood that the effects of the present invention include all effects that can be inferred from the description of the present invention.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of screening a solid electrolyte, the method comprising:

preparing a population by extracting a crystallographic information framework (CIF) of a compound comprising a specific element from a crystallography open database (COD) or an inorganic crystal structure database (ICSD);

screening a first group comprising compounds for which a site occupancy of the specific element in a unit cell is not 1 among the population;

screening a second group comprising compounds satisfying Condition 1 below among the first group;

preparing a third group by substituting each element of the compounds included in the second group with another element belonging to a same group of a periodic table, wherein the specific element is substituted with a lithium (Li) element; and screening compounds satisfying Condition 2 below among the third group:

[Condition 1]

Compound in which a mean square displacement of the specific element is 30 $Å^2$ or greater than 30 $Å^2$,

[Condition 2]

Compound in which a maximum framework displacement of an element in a unit cell is less than 50 Å.

2. The method of claim 1, wherein the specific element comprises silver (Ag) or copper (Cu).

3. The method of claim 1, wherein the mean square displacement of the specific element in Condition 1 is determined using Equation 1 below:

Mean square displacement of specific element = [Equation 1]

$$<[r(t)]^2>=\frac{1}{N}\sum_i<[r_i(t+t_0)]^2-[r_i(t_0)]^2>$$

wherein N is a number of the specific element (i) in a unit cell, t is a unit time, $r_i(t+t_0)$ is a displacement of the specific element (i) after a unit time has elapsed, and $r_i(t_0)$ is an initial position of the specific element (i).

4. The method of claim 1, wherein the maximum framework displacement of the element in the unit cell in Condition 2 is determined using Equation 2 below:

Maximum framework displacement of element in unit cell = $\max[D_i]$ [Equation 2]

-continued $$D_i=d_i(\Delta t)-\sum_{i=0}^{n}\frac{d_i(\Delta t)}{n}$$

wherein $d_i(\Delta t)$ is a displacement of an element (i) in a unit cell at a given time (dt), and n is a total number of elements in the unit cell.

5. The method of claim 1, further comprising screening compounds satisfying Condition 3 below among the compounds satisfying Condition 2:

[Condition 3]

Compound having a relative displacement of less than 1, wherein the relative displacement is determined using an equation $$\text{Relative displacement}=\max\left(\frac{MSD_{fi}}{MSD_{mi}}\right),$$

in which $MSD_{mi}$ is a mean square displacement of a lithium (Li) element and $MSD_{fi}$ is a mean square displacement of an element in a unit cell.

* * * * *